(12) United States Patent
Del Fabro et al.

(10) Patent No.: US 7,762,759 B2
(45) Date of Patent: Jul. 27, 2010

(54) FEEDER DEVICE FOR BARS AND RELATIVE FEEDING METHOD

(75) Inventors: Giorgio Del Fabro, Tricesimo (IT); Marcello Del Fabro, Tavagnacco (IT)

(73) Assignee: M.E.P. Macchine Elettroniche Piegatrici SpA, Reana Del Rojale (IT)

( * ) Notice: Subject to any disclaimer, the term of this patent is extended or adjusted under 35 U.S.C. 154(b) by 1054 days.

(21) Appl. No.: 10/585,413

(22) PCT Filed: Mar. 25, 2004

(86) PCT No.: PCT/IB2004/000894

§ 371 (c)(1), (2), (4) Date: Jul. 7, 2006

(87) PCT Pub. No.: WO2005/080021

PCT Pub. Date: Sep. 1, 2005

(65) Prior Publication Data

US 2009/0191041 A1    Jul. 30, 2009

(30) Foreign Application Priority Data

Jan. 23, 2004   (IT)   ............... UD2004A0012

(51) Int. Cl.
*B66F 11/00*   (2006.01)
*B66C 1/00*    (2006.01)

(52) U.S. Cl. ............... 414/745.7; 414/737; 414/745.1; 414/745.9; 414/730; 901/6; 901/40

(58) Field of Classification Search ............... 271/18.1, 271/18.2, 901; 414/18–20, 745.1–745.3, 414/745.7–745.9, 746.1–746.4, 746.8, 789.1, 414/793.2, 796.9, 797.1, 900; 72/420–422; 83/268, 277; 901/40, 6
See application file for complete search history.

(56) References Cited

U.S. PATENT DOCUMENTS 4,648,770 A * 3/1987 Berz et al. ............... 414/788.2
4,732,066 A * 3/1988 Del Fabro et al. ............ 83/277

(Continued)

FOREIGN PATENT DOCUMENTS

DE   1144569   2/1963

(Continued)

OTHER PUBLICATIONS

US Published Patent Appln. No. 2003/0201149 A1, (U.S. Appl. No. 10/353,985), Miglioranza, filed Jan. 30, 2003, published Oct. 30, 2003.

(Continued)

*Primary Examiner*—Gregory W Adams
(74) *Attorney, Agent, or Firm*—Novak Druce + Quigg LLP

(57) ABSTRACT

Device and method to pick up and remove from a bundle one or more bars in order to arrange them for use in an operating machine. The device comprises first magnetic means to separate from the bundle an end segment of a plurality of bars and to arrange at least the end segments of plurality bars on a plane distanced with respect to the bundle. The device comprises second magnetic means to pick up, from the first magnetic means, at least one bar at a time from the plurality of bars and to unload the at least one bar in a desired release position.

25 Claims, 8 Drawing Sheets

U.S. PATENT DOCUMENTS

| | | | | |
|---|---|---|---|---|
| 5,345,806 | A | * | 9/1994 | Sartorio et al. ................. 72/422 |
| 5,387,072 | A | * | 2/1995 | Gepfert et al. ........... 414/794.3 |
| 6,763,926 | B2 | | 7/2004 | Miglioranza |
| 2003/0202873 | A1 | * | 10/2003 | Miglioranza ............. 414/745.7 |

FOREIGN PATENT DOCUMENTS

| | | |
|---|---|---|
| DE | 7916259 | 9/1979 |
| EP | 0790086 | 8/1997 |
| EP | 1356875 | 10/2003 |

OTHER PUBLICATIONS

US Published Patent Appln. No. 2003/0202873 A1, (U.S. Appl. No. 10/421,904), Miglioranza, filed Apr. 24, 2003, published Oct. 30, 2003.

* cited by examiner

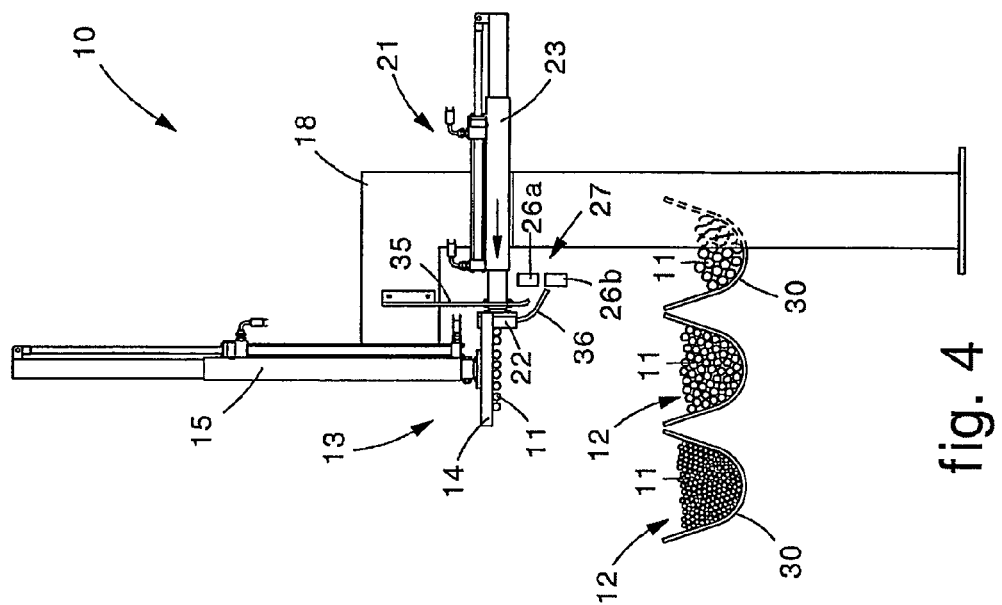
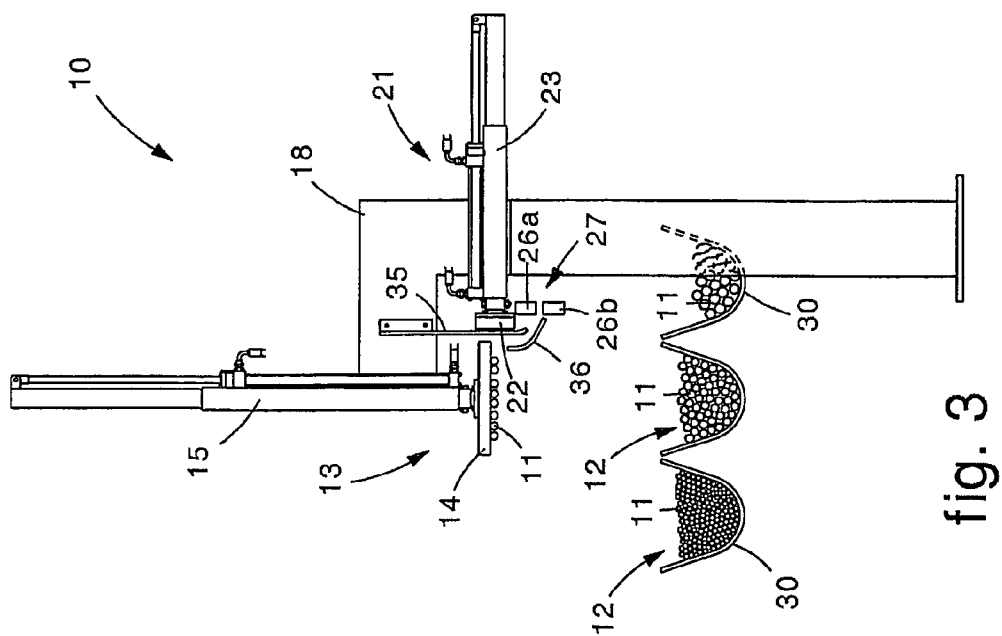

FEEDER DEVICE FOR BARS AND RELATIVE FEEDING METHOD

This application is a §371 National Stage Application of International Application No. PCT/IB2004/000894, filed on 25 Mar. 2004, claiming the priority of Italian Patent Application No. UD2004A000012 filed on 23 Jan. 2004.

FIELD OF THE INVENTION

The present invention concerns a feeder device for bars, able to be used advantageously in association with machines for working bars such as stirrup-making machines, bending machines, shaping machines, tying machines or other similar or comparable type of machine.

The feeder device according to the invention is suitable to pick up, in a substantially automatic manner, one or more bars at a time from a bundle of bars and to arrange said one or more bars to be fed to the operating machine.

The invention also concerns the method that uses the feeder device.

BACKGROUND OF THE INVENTION

Machines are known for working bars which work one or more bars at a time, for example to make shaped pieces for the building field or other type of product. The machines that use pre-cut bars normally have one or more feed zones wherein a bundle is discharged and/or arranged, from which the bars to be sent to the machine are picked up on each occasion.

The operation to pick up and remove the individual bars from the bundle is often very difficult since the bars, which can even reach 12 m in length and more, are all pell-mell, twisted and tangled with each other. To remove one bar from the bundle, taking it by one end, requires a great deal of effort for the worker, with risks to his safety and a slow-down in the operating cycle, which reduces the productivity of the machine.

At least partly automatic devices to feed bars to operating machines have been proposed, some of which use magnetic pick-up means. However, such devices have shown themselves to be insufficient and unproductive, due to the difficulty of removing a bar from a bundle wherein the bar is twisted and, for a large part of its length, subject to the weight of the other bars in the bundle.

Moreover, such devices are normally equipped to remove bars having a limited range of diameters, inasmuch as their pick-up and positioning means are effective for bars with a size within a certain range, and must be replaced or in any case adapted if the bars to be worked are of a different size.

For example, these pick-up and positioning means can comprise screws or Archimedes screws that guarantee that the bars are held and transported correctly only if the bars have a diameter less than the pitch between the coils of the screws.

Another disadvantage of known machines is that they are not able to guarantee with certainty the exact number of bars picked up, which creates problems in counting and hence in the correct feed of the right number of bars to the operating machine.

Known devices also have the problem that the loaded bars may be partially misaligned and/or overlap, and that the drawing members of the operating machines to which the feeder device is associated may be incorrectly positioned.

All these shortcomings have the result that the operation to automatically feed the bars must often be interrupted due to the bars jamming and/or errors in the number of bars to be fed, with a consequent blockage of the operating machine located downstream and the need for a manual intervention to restore operations.

Purpose of the invention is to achieve a feeder device for bars, suitable to selectively pick up, in a substantially automatic manner, one or more bars at a time from a bundle of bars and to arrange them for feeding to an operating machine which will overcome and solve the shortcomings to be found in analogous devices in the state of the art.

Another purpose is to be able to operate on bars substantially of any diameter, and to ensure that they are counted without errors caused by overlapping or by the undesired pick-up of multiple bars.

Applicant has devised, tested and embodied the present invention to overcome these shortcomings and to obtain other advantages.

SUMMARY OF THE INVENTION

The present invention is set forth and characterized in the main claims, while the dependent claims describe other innovative characteristics of the invention.

According to the invention, the device comprises first magnetic means, arranged substantially in cooperation with an end part, or near the end, of the bundle of bars from which the bar or bars are to be picked up, and second magnetic means able to cooperate with said first magnetic means in order to selectively pick up the bar or bars to be sent to the machine.

In a preferential embodiment, the first magnetic means have a relative magnetic element arranged substantially transverse to the longitudinal development of the bars, which covers with its extension substantially all the width of the bundle, or a substantial part of the width, from which the bars are taken.

To be more exact, the first magnetic means are associated with first movement means able to move them, at least in a first step of the pick-up and removal cycle, and at least for a part of their approach movement, in a direction substantially orthogonal to the plane on which the bundle of bars lies; their function is to lift at least the end parts of a plurality of bars with respect to the bundle. To be more exact, the raised ends of the bars are arranged substantially adjacent on a single plane defined by the attractive surface of the magnetic element of the first magnetic means.

According to a variant, the first magnetic means comprise two or more distinct magnetic elements able to cooperate with the bars at relative two or more different points on their length.

The second magnetic means are associated with second movement means able to move them, at least in a second step of the pick-up and removal cycle, in a direction substantially parallel, slant-wise or curved, with respect to the plane on which the bundle of bars lies and/or with respect to the bars, temporarily co-planar, whose ends are held raised by the first magnetic means; said second magnetic means are suitable to pick up from the first magnetic means, selectively, the end part of one or more bars, advantageously one at a time, and to displace it and then release it in the desired position, in order to arrange it to be fed to the operating machine.

In a preferential embodiment, the second magnetic means cooperate with at least a drawing assembly, comprising rollers, grippers or other type, in cooperation with which the bar or bars, selectively picked up by the second magnetic means, are released and arranged so as then to be removed completely from the bundle and sent for working.

With the solution described above, even if the bars are tangled and twisted in the bundle, they can be selectively picked up and removed individually, or in the desired number of two or more, from the bundle, thanks to the cooperation between the two magnetic means and the fact that they are picked up in two distinct phases.

To be more exact, as said above, in a first step of the pick-up cycle, the first magnetic means form a pick-up plane consisting of a plurality of adjacent bars, and the second magnetic means interact with the first magnetic means in order to selectively pick up, and in an orderly and univocal manner, with no possibility of errors, overlapping or misalignment, one or more bars at a time and unload them in the desired position, for example in a drawing element of the drawing assembly of an operating machine located downstream.

The second movement means associated with the second magnetic means, in a preferential embodiment, are able to allow a selective and controlled displacement thereof for the whole width of the first magnetic means, in order to allow the bar or bars to be selectively picked up in any position whatsoever of said first magnetic means.

According to a preferential form of embodiment, the second movement means associated with the second magnetic means comprise a linear actuator able to move the second magnetic means on a plane substantially parallel to the plane on which the bars lie and in a direction substantially orthogonal to the longitudinal development of the bars, from a first pick-up position, cooperating with the first magnetic means, to a second unloading position, cooperating with the drawing assembly, or with another element of the operating machine. In this unloading position, the second magnetic means cooperate with unloading means, for example a stop element, which cause the bar to become detached and to fall from said second magnetic means, advantageously in a position of cooperation with a drawing element of the operating machine.

The second magnetic means are therefore able to pick up, for example one at a time, the bars whose ends are held raised by the first magnetic means, starting from the bar in the most lateral position, and then continuing until all the bars raised by the first magnetic means have been picked up.

According to a variant, said second magnetic means are moved in a curved trajectory with respect to the plane on which the bars lie, and can pick up the bars at any point of the attractive surface defined by said first magnetic means.

According to another variant, the first magnetic means are also moved, at least for part of their trajectory, in a curved or slanted direction with respect to the plane on which the bars lie, and then are lowered substantially orthogonally to said plane in the step to pick up and raise the ends of the bars.

In a preferential embodiment, the first and/or second magnetic means consist of electromagnets associated with selective feed means. According to a variant, the first and/or second magnetic means consist of permanent magnets.

In a further preferential embodiment, the first and the second magnetic means are mounted on a movable support suitable to be displaced on each occasion in correspondence with the feed zone of the operating machine where there is the bundle from which the bars to be worked are to be taken.

In another preferential embodiment, in correspondence with, or in proximity with, the position where the bars are unloaded from said second magnetic means, there are means able to be selectively activated and suitable to correct possible defects in the positioning of the bars, for example due to even only partial misalignments or overlapping, in the drawing assembly of the operating machine. The drawing assembly can consist of rollers or, in a preferential embodiment, one or more grippers with alternating movement.

In another preferential embodiment, in cooperation with the leading ends of the bars there is a header element, able to be selectively activated at least when a plurality of bars have been picked up by said first magnetic means, are raised with respect to the bundle and are arranged substantially on a single plane.

In a further preferential embodiment, the stop element that causes the bar picked up by the second magnetic means to become detached and fall into the drawing assembly of the operating machine has an at least partly curved abutment surface in order to facilitate the detachment and to prevent the bar from rebounding.

In another preferential embodiment, at least the first magnetic means are connected to the respective movement means by means of an articulated connection that facilitates a correct and complete pick-up of the ends of the bars from the bundle, even when there are containers with a curved or shaped bottom, and even when only a few residual bars remain in the container to be picked up.

BRIEF DESCRIPTION OF THE DRAWINGS

These and other characteristics of the present invention will become apparent from the following description of some preferential forms of embodiment, given as a non-restrictive example, with reference to the attached drawings wherein:

FIGS. 1-5 show a side view of one form of embodiment of the feeder device for bars according to the present invention in one sequence of its operating cycle;

DETAILED DESCRIPTION OF SOME PREFERENTIAL FORMS OF EMBODIMENT OF THE INVENTION

With reference to the attached figures, a feeder device 10 for bars 11 according to the invention is suitable to be located upstream of an operating machine such as a stirrup-making machine, bending machine, shaping machine, tying machine or any other machine of a similar type or not.

Figure 2:
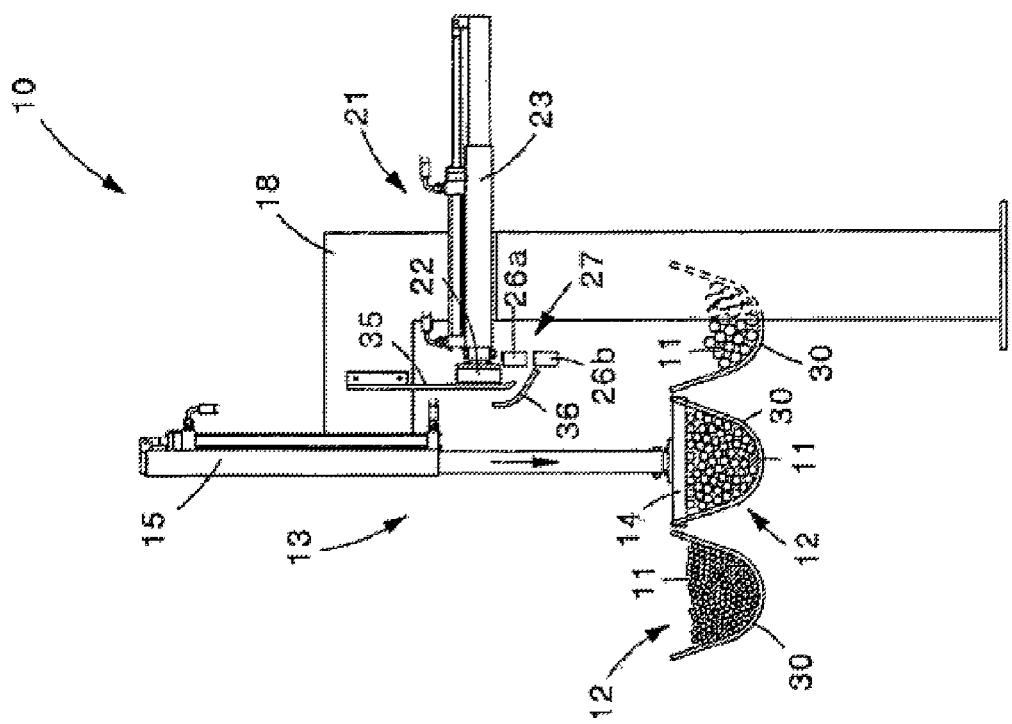

Of said operating machine the attached figures show a drawing assembly, or drawer, 27, 127, which can consist of rollers 26a, 26b (FIGS. 1 and 2); 126a, 126b (FIGS. 6 and 7), or a gripper 226 with alternating movement (FIGS. 9 and 10); it is understood, however, that the drawing assembly can be of any other type.

The feeder device 10 is suitable, without requiring any modification or re-configuration, to operate on bars 11 substantially of any length and/or diameter, guaranteeing in any case to pick up the bars in an orderly and efficient manner, and to count them without mistakes.

The feeder device 10 is suitable to pick up, from a bundle of bars 12 lying at least partly in a housing seating 30, one or more bars 11 at a time to be sent to the operating machine. In this case, the housing seating 30 comprises three pockets, movable laterally, inside each of which bars 11 of different sizes are arranged.

It comes within the field of the invention that the feeder device 10 is movable with respect to the pockets 30, or other housing seating for the bars 11, in order to move selectively according to the type or size of bars 11 to be picked up.

The possibility of moving the pockets 30 with respect to the feeder device 10, or vice versa, also allows to sequentially feed the machine with bars 11 having a different diameter, if the working program requires it, substantially without interrupting the work cycle of the machine downstream.

The feeder device 10 is mounted in this case on a supporting frame 18 and comprises first magnetic means 13 consisting of a first magnetic or electromagnetic element 14 arranged advantageously during use in proximity with one end of the bars 11 of the bundle 12.

It comes within the field of the invention that the first magnetic means 13 comprise two or more magnetic or electromagnetic elements 14, arranged at several distinct points on the length of the bars 11, advantageously near their front ends.

The first magnetic element 14 is located with a direction mainly transverse to the longitudinal development of the bars 11 lying in the respective pocket 30, and advantageously has a width such as to cover the entire width of the bundle 12. The first magnetic element 14 is associated with a first linear actuator 15, for example of the fluid-dynamic type; in the embodiment shown in FIGS. 1-5 the linear actuator 15 is movable vertically.

Thanks to the linear actuator 15, the magnetic element 14 can be moved along a first, substantially vertical operating direction, and correctly positioned in correspondence with the desired bundle 12 from which the bars 11 are to be picked up.

Figure 1:
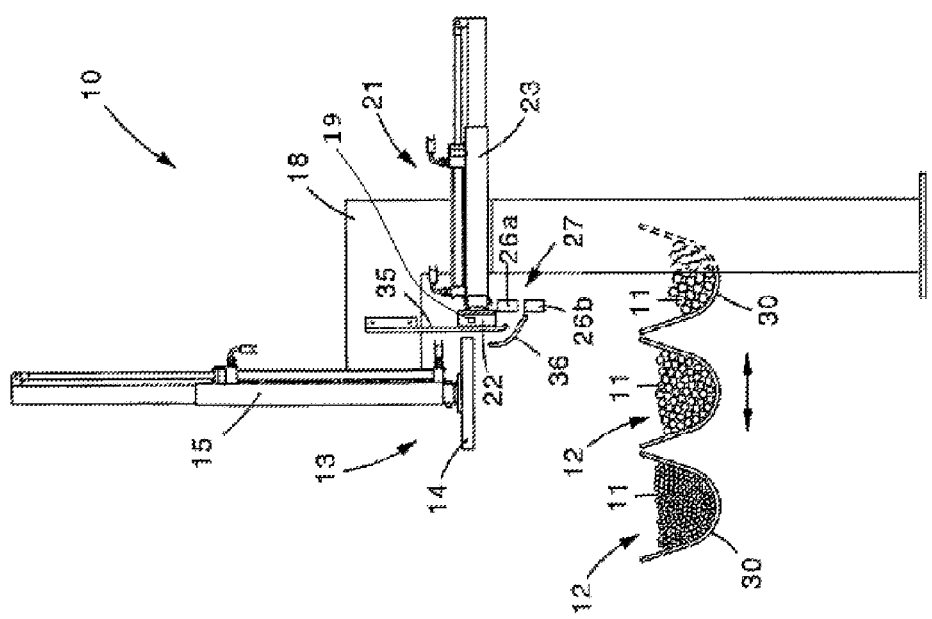
Figure 5:
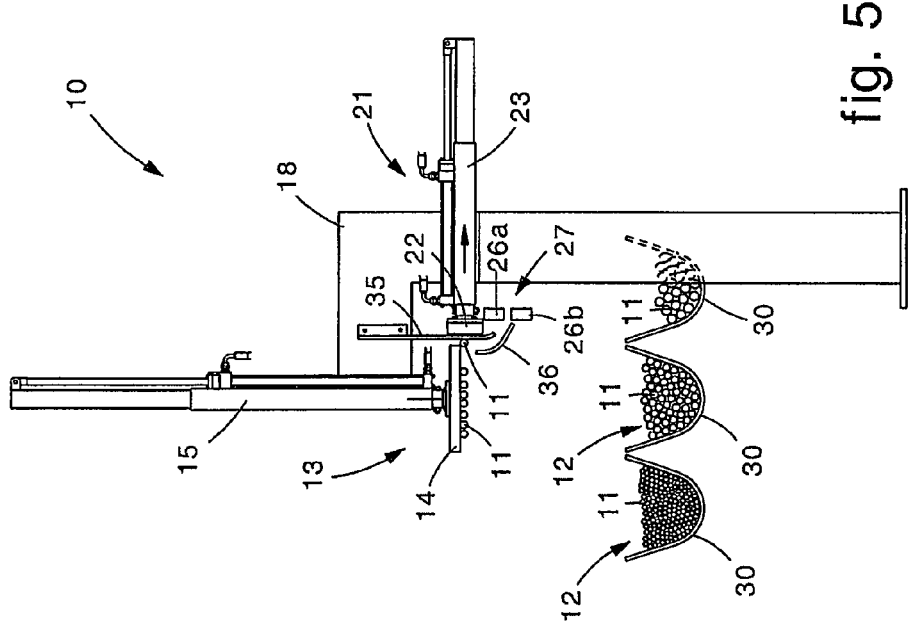

At the start of the pick-up cycle, the magnetic element 14 is lowered towards the bundle 12, by means of the first linear actuator 15, to take the lower face thereof, comprising the attractive surface, to a position such as to exert an effect of magnetic attraction on the ends of the bars 11 located at the highest part of the bundle 12 (FIG. 1). Subsequently, the magnetic element 14 is returned upwards, magnetically lifting the ends of one layer of bars 11 (FIG. 3) arranged adjacent to each other so as to form substantially a plane.

Figure 8:
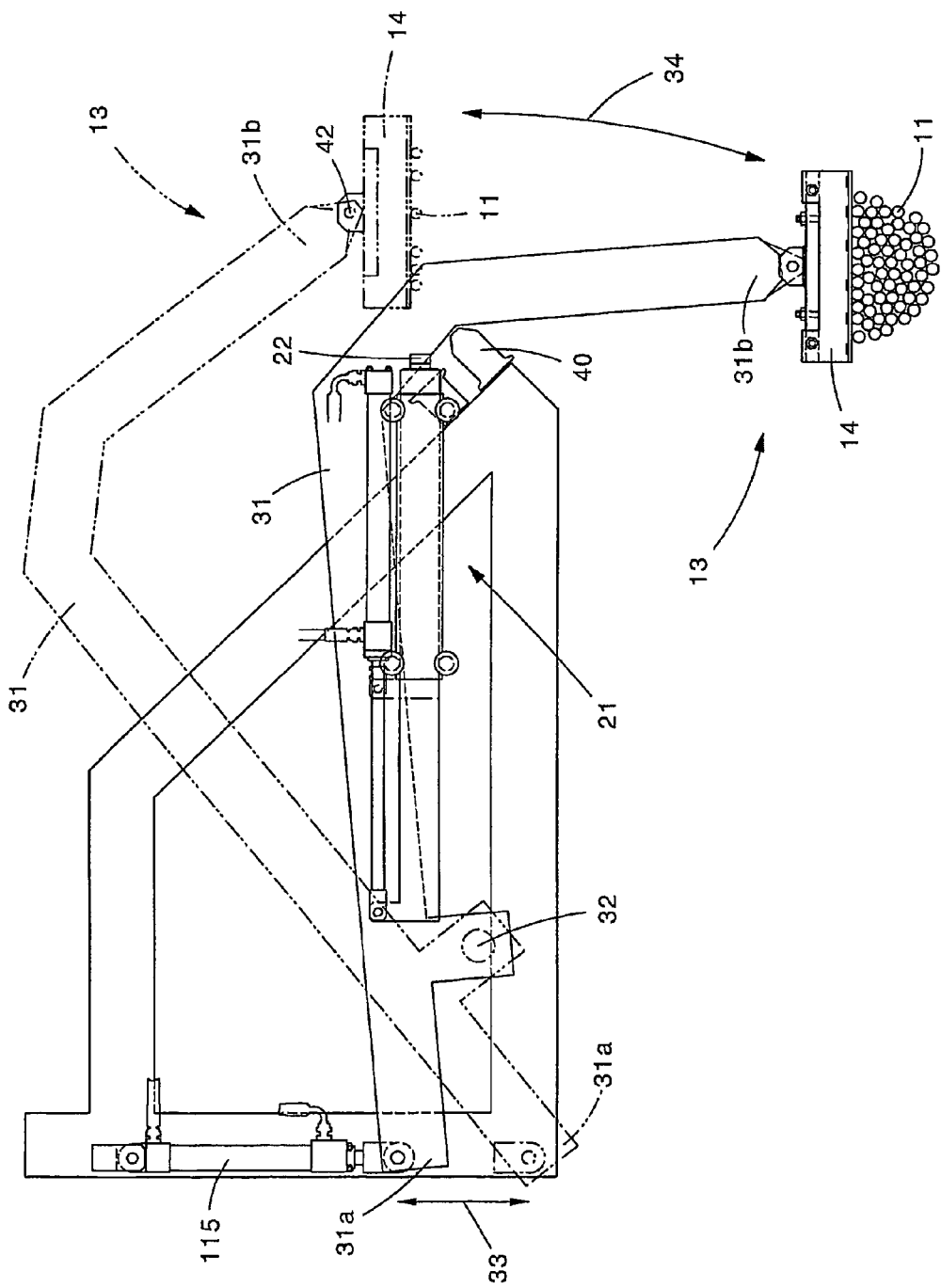
FIG. 8 shows an enlarged scale front view of a variant of a detail of the device in FIG. 1.

According to the variant shown in FIG. 8, the first magnetic element 14 is mounted on a shaped arm 31 pivoting on an oscillation pin 32. At its rear end 31a an actuator 115 is associated which allows, with a very limited excursion 33, the magnetic element 14 solid with the opposite end 31b of the shaped arm 31, to make a partly curved trajectory 34 during the step wherein the ends of the bars 11 are picked up and lifted.

Figure 9:
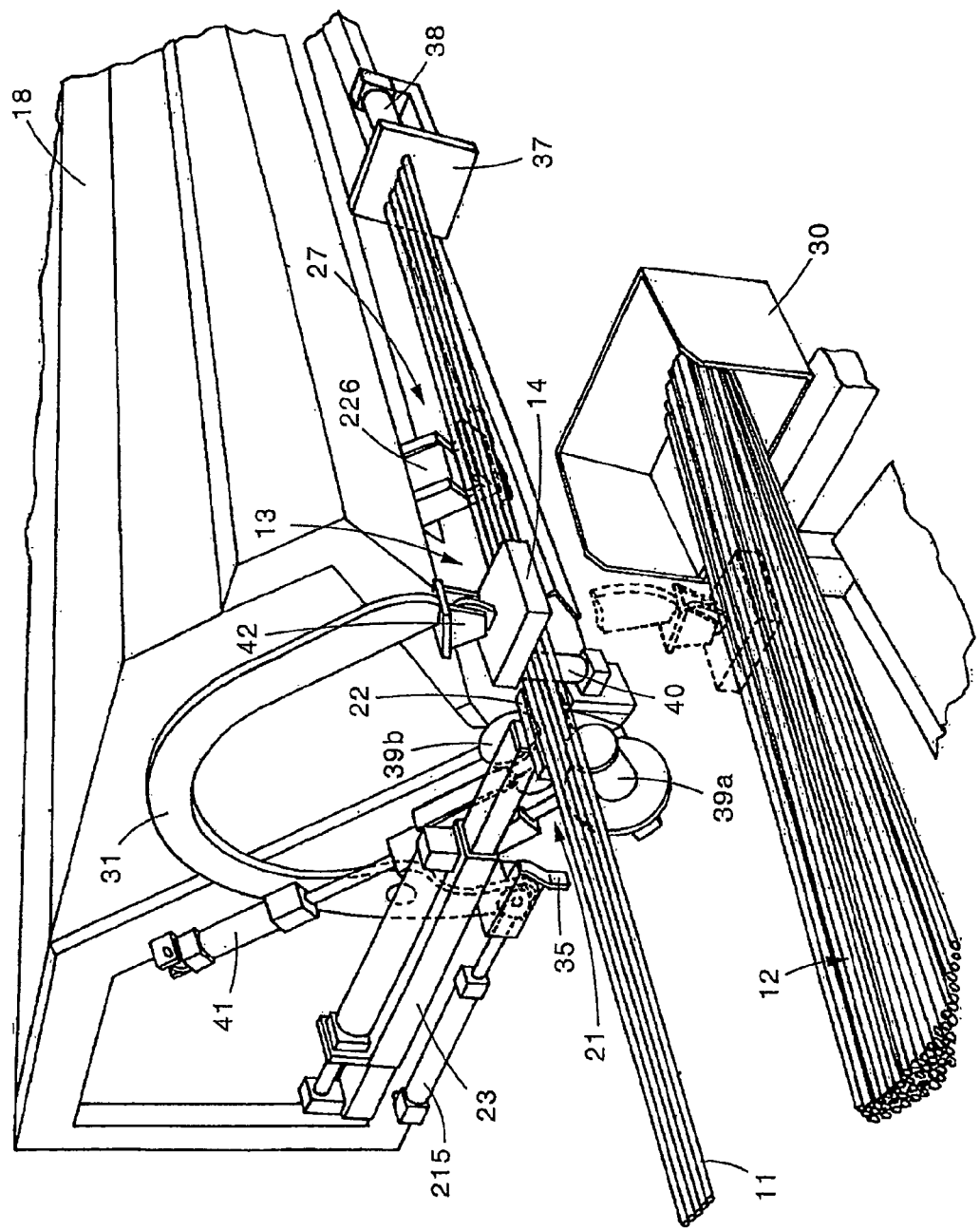
FIGS. 9 and 10 show a perspective view of a feeder device for bars according to the invention in two different steps of the cycle to pick up the bars from a bundle.
Figure 10:
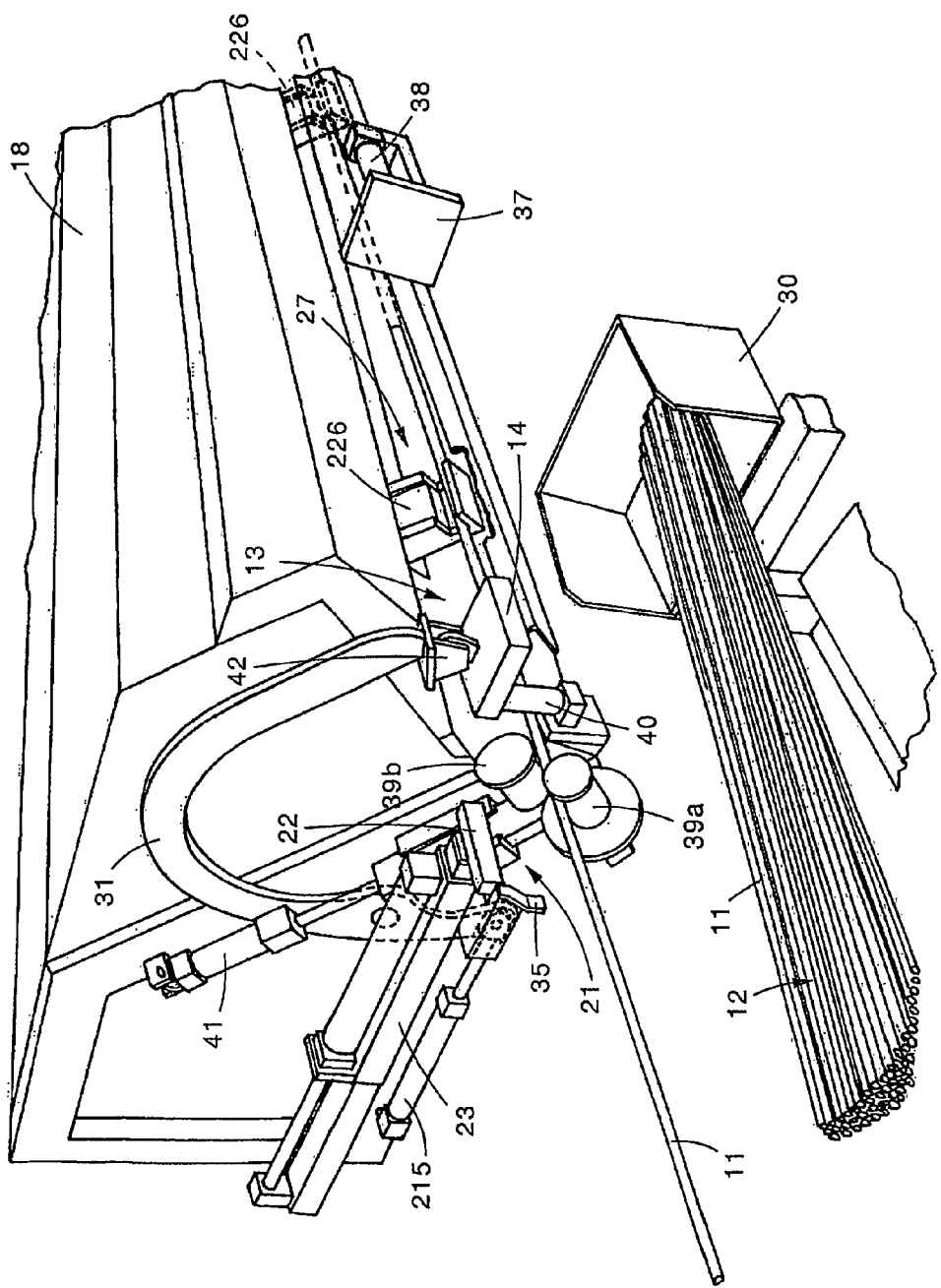

According to the further variant shown in FIGS. 9 and 10, the first magnetic element 14 is mounted at a first end of a curved arm 31, at the other end of which an actuator 215 is associated, arranged on a substantially horizontal plane.

In both these solutions, the first magnetic element 14 is mounted on the relative arm 31 by means of an articulated joint 42, which allows it a certain freedom to oscillate, in order to facilitate the pick-up of the bars 11 even when the pockets 30 have a curved and/or shaped bottom, and also if there are only a few bars 11 remaining on the bottom of the pockets 30.

When the ends of the bars 11 have been raised by means of the upward movement of the first magnetic means 13, second magnetic means 21 are activated, which comprise a second magnetic element 22 mounted at the end of a second linear actuator 23 mounted, in turn, on the supporting frame 18. Detection means 19 can be associated with said second magnetic means 21 to detect the absence of bars 11 on said first magnetic means 13 and to give consent for a new pick-up cycle by said first magnetic means 13. Detection means 19 is shown in FIG. 1 but omitted from other figures for clarity.

Here too, it comes within the field of the invention that the second magnetic means 21 comprise two or more magnetic elements 22 able to act at two or more distinct points on the length of the bars 11.

The second linear actuator 23 is able to act in a direction substantially perpendicular to the longitudinal development of the bars 11, so as to move, in this case horizontally, the second magnetic element 22 from a first advanced pick-up position (FIG. 4; FIG. 9), wherein it moves into cooperation with the attractive surface of the first magnetic element 14 in order to pick up one or more bars 11 from it, advantageously one bar 11 at a time, to a second retracted release position (FIG. 5; FIG. 10). In the second position, it releases the end of the specific bar or bars 11, which it has picked up from the first magnetic element 14, in correspondence with the drawing assembly 27, in this case consisting of two rollers 26a, 26b; 126a, 126b or of the gripper 226.

Advantageously, the second magnetic means 21 and the first magnetic means 13 are staggered with respect to each other on the length of the bars 11, so that, when the second magnetic element 22 is in its pick-up position, it does not interfere with the first magnetic element 14.

In the embodiment shown here, the sequential pick-up of the bars 11 starts with the bar located in the most lateral position facing towards the second magnetic element 22 (extreme right in FIGS. 1-5 and extreme left in FIGS. 9 and 10), and then continues picking up the bars 11 one by one towards the inside until the bars 11 held raised by the first magnetic element 14 are all used up. When the second magnetic element 22 performs an empty travel without meeting bars 11, consent is given for a new descent of the first magnetic element 14 towards the bundle of bars 11 to pick up a new bar or bars 11.

Progressively retreating to the release position, the second magnetic element 22 moves beyond a stop element 35, which stops the picked up bar 11 by detaching it from the second magnetic element 22. This detachment causes the bar 11 to fall due to gravity, and it is channeled, for example by means of a slide 36 (FIGS. 1-5), into the drawing assembly 27.

According to the variant shown in FIGS. 9 and 10, the stop element 35 has a curved conformation, so that the detachment of the bar 11 from the second magnetic element 22, consequent to the contact with said stop element 35, occurs progressively and without risk of a rebound that could be caused by the bar 11 knocking against a surface orthogonal to its direction of displacement.

The variant shown in FIGS. 9 and 10 also shows a pair of rollers, respectively fixed 39a and movable 39b, cooperating with a fixed contrasting element 40 arranged substantially aligned with the fixed roller 39a.

The movable roller 39b is associated with a positioning actuator 41 and can assume a first inactive position, distanced from the fixed roller 39a (FIG. 9), and a second operating position wherein it is brought near the fixed roller 39a and the contrasting element 40 (FIG. 10).

To be more exact, throughout the whole step of the cycle wherein the second magnetic element 22 picks up a bar 11 from the first magnetic element 14 and makes it fall into the drawing assembly 27, the movable roller 39b remains distant from the fixed roller 39a so that a segment of the bar 11 released by the second magnetic element 22 can be freely positioned resting on the fixed roller 39a and on the contrasting element 40, in the free space between the fixed roller 39a and the movable roller 39b.

As soon as one bar 11 has been released, the movable roller 39b is lowered and taken towards the fixed roller 39a, for example with several cycles of alternating, backwards-forwards movement. This movement of the movable roller 39b, exerting a pressure on the bar 11 contrasted by the fixed roller 39a and the contrasting element 40, allows to ensure that the end of the bar 11 is positioned correctly on the bottom of the throat of the gripper 226 (FIG. 10), eliminating possible positioning errors and incorrect arrangements of the bar 11. This operation of the rollers 39a and 39b is repeated, bar by bar, also if two or more bars 11 are loaded together into the drawing assembly 27 in order to be worked simultaneously by the operating machine downstream. In this case, the operation to correct positioning or alignment defects is even more important since a partial overlapping of the two or more bars and/or an incorrect and non-homogenous grip by the gripper 226 on the two or more bars 11 can cause considerable operating problems in the operating machine downstream.

The rollers 39a and 39b can also remain closed on the bars 11, without exerting great pressure, during the cycles of alternating movement of the gripper 226, in order to prevent, during the return journey, the gripper 226 from causing the bars 11 to move in retreat.

When this positioning step is terminated, the rollers close on the bar 11 and the drawing assembly 27 is started in order to remove the bar 11 from the bundle 12 and send it towards the operating machine.

According to the variant shown in FIGS. 9 and 10, downstream of the magnetic elements 14 and 22 there is a header element 37, associated with a movement actuator 38. The function of the header element 37 is to align the bars 11 with respect to each other, by acting repeatedly against the relative ends, after they have been picked up by the first magnetic element 14 and are kept raised with respect to the bundle.

The header element 37, by selectively activating the movement actuator 38, performs some abutment cycles against the ends of the bars 11 (FIG. 9), making the longitudinal arrangement thereof equal in order to facilitate the subsequent step of loading the bars 11 into the drawing assembly 27 and the operations to be carried out thereafter.

Figure 6:
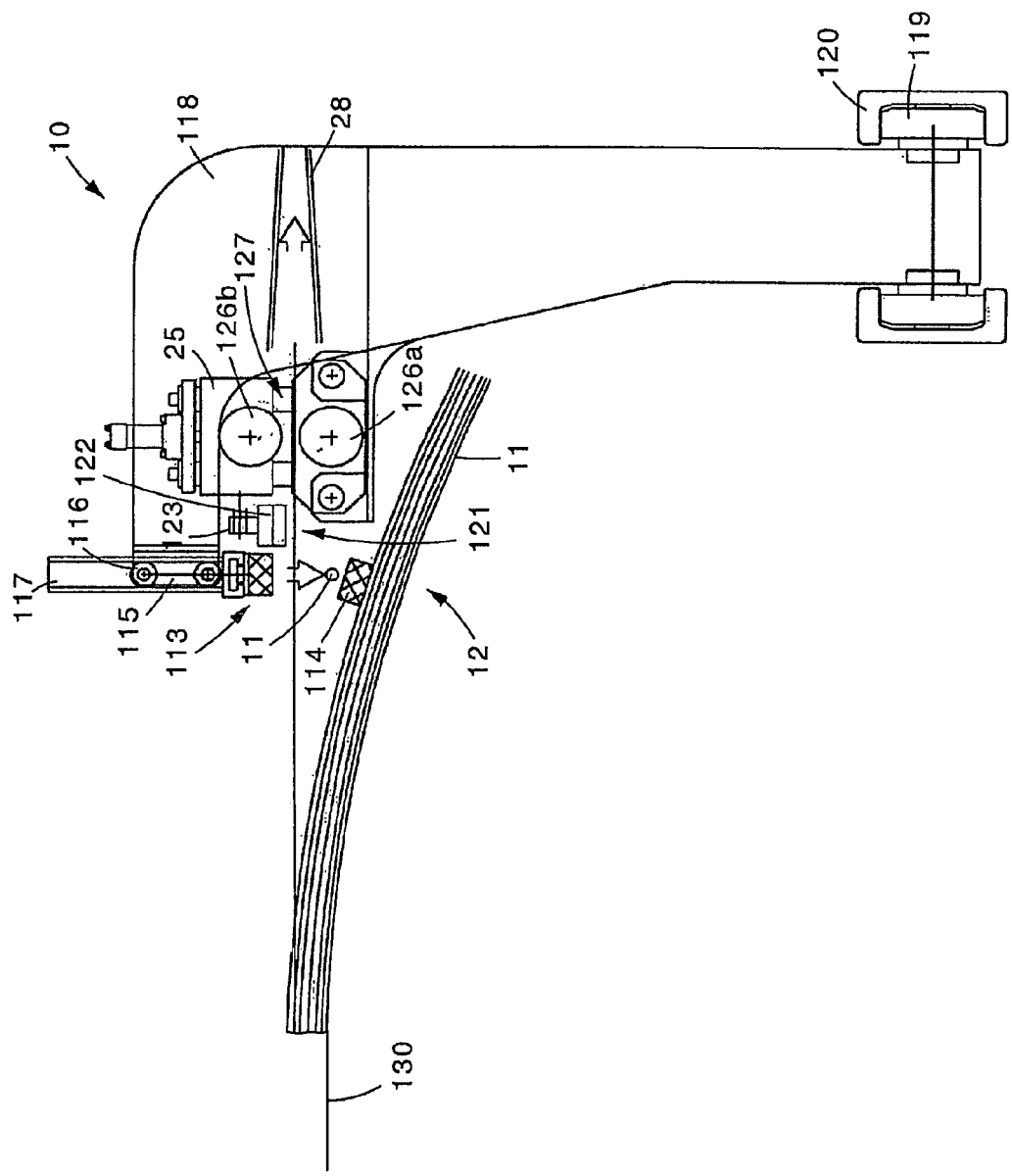
FIG. 6 shows a side view of another embodiment of the feeder device for bars according to the invention.
Figure 7:
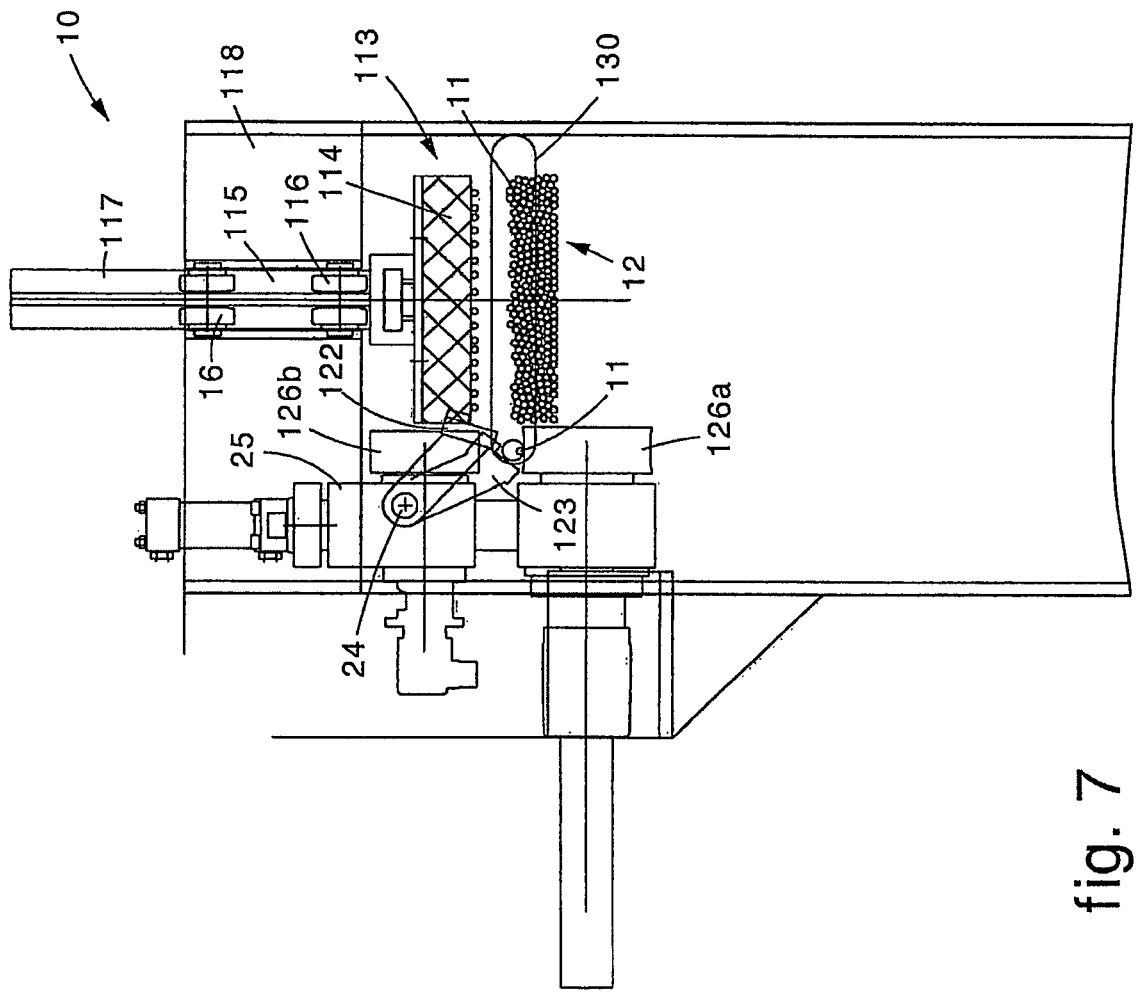
FIG. 7 shows a partial front view of the device in FIG. 6.

In the embodiment shown in FIGS. 6 and 7, wherein the same reference numbers with the addition of 1 refer to the same or equivalent components of the feeder device 10 for bars 11, the feeder device 10 according to the present invention cooperates with a plane 130 on which the bundle 12 of bars is arranged. The feeder device 10 comprises first magnetic means 113 consisting of a first magnetic or electromagnetic element 114 arranged advantageously during use in proximity with one end of the bars 11 of the bundle 12.

The first magnetic element 114 is located transversely to the longitudinal development of the bars 11 lying on the supporting plane 130, and advantageously has a width such as to cover the entire width of the bundle 12. The first magnetic element 114 is associated with a movement trolley 115 movable by means of pairs of opposite wheels 116 on guides 117.

The trolley 115 and the guides 117 themselves are mounted at the upper end of a supporting frame 118, the lower end of which is associated with a pair of wheels 119 that slide in respective guides 120. Thanks to this movable structure, the magnetic element 114 can be correctly positioned in correspondence with the desired bundle 12 from which the bars 11 are to be picked up, by moving the frame 118 along the guides 120. This also allows to use the same feeder device 10 for a plurality of machines fed from relative bundles 12 of bars 11, also located at relatively distant positions from each other.

As in the previous embodiment, the magnetic element 114 is lowered towards the bundle 12, in this case by moving the trolley 115 downwards, in order to take the lower face thereof to a position such as to exert an effect of magnetic attraction on the ends of the bars 11 located at the highest part of the bundle 12 (FIG. 6). Subsequently, the magnetic element 114 is returned upwards, magnetically lifting the ends of one layer of bars 11 (FIG. 7) arranged adjacent to each other in order to form a plane.

At this point the second magnetic means 121 are activated, which in this case comprise a second magnetic element 122 mounted at the end of an arm 123 rotary on a pin 24. The pin 24 is solid with a containing frame 25 also mounted on the supporting frame 118.

The rotary arm 123 allows to displace the second magnetic element 122 from the first pick-up position to the second release position, in a substantially curved direction. This allows to pick up one or more bars 11 whatever their position on the first magnetic means 114 may be.

In the release position the second magnetic element 122 positions in this case the end of the selected bar 11 between the opposite rollers 126a and 126b of a drawing assembly 27.

Thanks to the fact that it uses two distinct and operationally autonomous magnetic means 13, 113 and 21, 121, which in a first step separate the ends of a first upper layer of bars 11 from the bundle 12, and in a second step pick up the selected bar or bars in order to locate them in a drawing assembly 27, the feeder device 10 allows an easy and rapid automatic removal of one or more bars 11, even if they are located tangled and twisted in a bundle 12.

Moreover, the compactness and limited bulk of the feeder device 10 allow it to be assembled in a movable structure which permits the selective displacement thereof, in order to serve a plurality of independent operating machines, also of different types and also located at several distinct points of the plant.

It is clear, however, that modifications and/or additions of parts may be made to the feeder device 10 as described heretofore, without departing from the field and scope of the present invention.

For example, a variant of the device may provide that, above the first magnetic element 14 there are fixed stop elements which allow to discharge, and make fall into the relative bundle 12, the bars 11 which have remained gripped on said first magnetic element 14 once the work cycle of the machine has been stopped. This discharge is obtained by lifting the first magnetic element 14 by an extra travel beyond said stop elements. The discharge of the bars 11 can also be obtained, when electromagnetic elements are used, by temporarily de-activating the electric feed to said first magnetic element 14.

The invention claimed is:

1. Feeder device for bars, for picking up and removing, in a pick up and remove cycle, selectively from a bundle at least one bar to arrange the at least one bar for use in an operating machine, the device comprising:

a first magnetic means comprising a first magnetic element and a first actuator, the first magnetic element selected from the group consisting of a first permanent magnet and a first electromagnet, the first actuator for moving the first magnetic element, the first magnetic element being functionally attached to the first actuator, the first magnetic means for separating from said bundle at least an end segment of a plurality of bars and arranging at least the end segment of said plurality of bars on a plane distanced with respect to said bundle, wherein the first magnetic element is moveable by the first actuator at least in a first step of the pick-up and removal cycle and at least for a part of the movement, in a first substantially vertical operating direction substantially orthogonal to a plane on which the bundle of bars lies to raise the end segment of the plurality of bars with respect to the bundle, and a second magnetic means comprising a second magnetic element and a second actuator, the first magnetic element selected from the group consisting of a second permanent magnet and a second electromagnet, the second actuator for moving the second magnetic element, the second magnetic element being functionally attached to the second actuator, the second magnetic means for picking up, from said first magnetic means, at least one bar at a time from said plurality of bars and to unload said at least one bar in a desired release position, wherein said second magnetic element is moveable by said second actuator at least in a second step of the pick-up and removal cycle, in a second operating direction parallel (23), curved (123) or slant-wise with respect to said bars supported by said first magnetic element to pick up from the first magnetic element said at least one bar and to displace said at least one bar towards the desired release position.

2. Device as in claim 1, wherein said first actuator is selected from a member of the group consisting of:

(A1) a first vertically moveable linear actuator (15);

(B1) a first linear actuator attached to a first end of a first arm selected from the group consisting of first shaped arm (31) and a curved arm (31), the first arm having a second end attached to the first magnetic element, and wherein the first substantially vertical operating direction substantially orthogonal to the plane on which said bundle of bars lies to raise the end segments of said plurality of bars with respect to said bundle is vertical, curved or slantwise; and wherein said second actuator is selected from a member of the group consisting of:

(A2) a second horizontally moveable linear actuator (23) for moving in the second operating direction parallel (23) with respect to said bars, and (B2) a rotary arm (123) for moving in the second operating direction curved (123) with respect to said bars.

3. Device as in claim 1, wherein said first actuator comprises a first vertically moveable linear actuator (15) and said second actuator comprises a second horizontally moveable linear actuator (23).

4. Device as in claim 1, wherein said second magnetic-means has a first advanced pick-up position, wherein the second magnetic means cooperates with said first magnetic means to pick up therefrom said at least one bar, and wherein the second magnetic means has a second retracted release position, and wherein the feeder device further comprises a stop element arranged along the return travel of said second magnetic means to determine the fall of said at least one bar from the second retracted release position.

5. Device as in claim 4, wherein said stop element has an at least partly curved conformation to determine a progressive detachment of said at least one bar from said second magnetic means.

6. Device as in claim 4, wherein a guide slide is located relative to said stop element to guide said at least one bar after it has been detached from said second magnetic means.

7. Device as in claim 4, wherein in said second release position said second magnetic means is arranged substantially in correspondence with a drawing assembly of said operating machine, into which said at least one bar is able to be unloaded.

8. Device as in claim 7, further comprising means for correcting positioning defects of said one or more bars with respect to said drawing assembly at the second release position, wherein the means for correcting is selectively activatable.

9. Device as in claim 8, wherein said means for correcting comprises a pair of rollers having a first reciprocally distanced inactive position and a second operating position wherein the pair of rollers are closed on said at least one bar.

10. Device as in claim 1, wherein in cooperation with the leading ends of said bars, there is a header element for being selectively activated at least when a plurality of bars have been picked up by said first magnetic means, are raised with respect to said bundle and are arranged substantially on a single plane.

11. Device as in claim 1, wherein said first magnetic element has a size, in a direction transverse to the longitudinal development of the bars, at least equal to the width of said bundle.

12. Device as in claim 11, wherein said first magnetic element is mounted on the first actuator comprising a relative supporting arm by an articulated connection.

13. Device as in claim 1, wherein at least one of the first magnetic means and the second magnetic means comprise said electromagnet.

14. Device as in claim 1, wherein at least one of the first magnetic means and second magnetic means comprise said permanent magnet.

15. Device as in claim 1, wherein said second magnetic means has a detector to detect the second magnetic means is returning from attempting to pick up at least one said bar from the first magnetic means without at least one said bar due to the absence of bars on said first magnetic means and to give consent for a new pick-up cycle by said first magnetic-means.

16. Device as in claim 1, wherein said bars are arranged in a plurality of housing seatings each one housing bars of different sizes, said housing seatings being reciprocally and selectively movable with respect to said first magnetic-means to allow the sequential pick-up of bars even of different sizes.

17. Device as in claim 1, wherein the first magnetic means and the second magnetic means are mounted on a movable support for moving in correspondence with the zone where there is said bundle from which said bars are to be picked up.

18. Device as in claim 1, wherein said second magnetic means has a direction of movement substantially perpendicular to a lowering and lifting direction of movement of the first magnetic means, to pick up one bar at a time from the first magnetic means and move the picked-up bar towards a discharge and operating position.

19. Method to feed bars, used to pick up and selectively remove, in a pick up and remove cycle, from a bundle at least one bar to arrange the at least one bar for use in an operating machine, comprising the steps of:

bringing a first magnetic element of a first magnetic means near said bundle to magnetically attract an end segment of a plurality of bars and distance the plurality of bars from said bundle, the first magnetic means comprising the first magnetic element and a first actuator, the first magnetic element selected from the group consisting of a first permanent magnet and a first electromagnet, the first magnetic element being functionally attached to the first actuator, wherein the first actuator moves the first magnetic element at least in a first step of the pick-up and removal cycle wherein, at least a part of the movement is in a first substantially vertical operating direction substantially orthogonal to a plane on which the bundle of bars lies to raise the end segment of the plurality of bars with respect to the bundle, and bringing a second magnetic element of a second magnetic means near said first magnetic element to pick up from the first magnetic element at least one of said plurality of bars, and then the second magnetic element with the at least one of said plurality of bars is distanced from the first magnetic element to arrange said at least one bar in a desired release position, the second magnetic means comprising the second magnetic element and a second actuator, the first magnetic element selected from the group consisting of a second permanent magnet and a second electromagnet, the second magnetic element being functionally attached to the second actuator, wherein the second actuator moves the second magnetic element at least in a second step of the pick-up and removal cycle, in a second operating direction parallel, curved or slant-wise with respect to the bars supported by the first magnetic element to pick up from the first magnetic element said at least one bar and to displace the picked up at least one bar towards the desired release position.

20. Method as in claim 19, wherein said second magnetic means is moved from a first advanced pick-up position cooperating with said first magnetic means to pick up said at least one bar to a second refracted release position wherein said second magnetic means cooperates with a drawing assembly of said operating machine to release said at least one bar into said drawing assembly.

21. Method as in claim 19, wherein between said distancing the plurality of bars from the bundle by the first magnetic means and said picking up at least one bar by the second magnetic means, the method further comprises moving a header element against respective ends of the bars of the plurality of bars to make the longitudinal positioning of said plurality of bars equal.

22. Method as in claim 19, wherein after the release of said at least one bar by the second magnetic means, the method further comprises correcting possible defects in the positioning of said bars inside said drawing assembly.

23. Method as in claim 19, wherein said second magnetic means has a direction of movement substantially perpendicular to a lowering and lifting direction of movement of the first magnetic means, to pick up one bar at a time from the first magnetic means and move the picked-up bar towards a discharge and operating position.

24. Feeder device for bars, for picking up and removing, in a pick up and remove cycle, selectively from a bundle at least one bar to arrange the at least one bar for use in an operating machine, the device comprising:

a first magnetic means for separating from said bundle at least an end segment of a plurality of bars and arranging at least the end segments of said plurality of bars on a plane distanced with respect to said bundle, and a second magnetic means for picking up, from said first magnetic-means, at least one bar at a time from said plurality of bars and to unload said at least one bar in a desired release position, wherein said second magnetic-means is moveable at least in a second step of the pick-up and removal cycle, in a second operating direction parallel, curved or slant-wise with respect to said bars supported by said first magnetic means to pick up therefrom one or more bars and to displace them towards said desired release position, wherein said second magnetic-means has a first advanced pick-up position, wherein the second magnetic means cooperates with said first magnetic means to pick up therefrom said at least one bar, and wherein the second magnetic means has a second retracted release position, and wherein the feeder device further comprises a stop element arranged along the return travel of said second magnetic means to determine the fall of said at least one bar from the second retracted release position, wherein a guide slide is located relative to said stop element to guide said at least one bar after it has been detached from said second magnetic means.

25. Feeder device for bars, for picking up and removing, in a pick up and remove cycle, selectively from a bundle at least one bar to arrange the at least one bar for use in an operating machine, the device comprising:

a first magnetic means for separating from said bundle at least an end segment of a plurality of bars and arranging at least the end segments of said plurality of bars on a plane distanced with respect to said bundle, and a second magnetic means for picking up, from said first magnetic-means, at least one bar at a time from said plurality of bars and to unload said at least one bar in a desired release position, wherein said second magnetic-means is moveable at least in a second step of the pick-up and removal cycle, in a second operating direction parallel, curved or slant-wise with respect to said bars supported by said first magnetic means to pick up therefrom one or more bars and to displace them towards said desired release position, wherein said second magnetic-means has a first advanced pick-up position, wherein the second magnetic means cooperates with said first magnetic means to pick up therefrom said at least one bar, and wherein the second magnetic means has a second retracted release position, and wherein the feeder device further comprises a stop element arranged along the return travel of said second magnetic means to determine the fall of said at least one bar from the second retracted release position, wherein in said second release position said second magnetic means is arranged substantially in correspondence with a drawing assembly of said operating machine, into which said at least one bar is able to be unloaded, further comprising means for correcting positioning defects of said one or more bars with respect to said drawing assembly at the second release position, wherein the means for correcting is selectively activatable, wherein said means for correcting comprises a pair of rollers having a first reciprocally distanced inactive position and a second operating position wherein the pair of rollers are closed on said at least one bar.

* * * * *